United States Patent [19]

Ashley

[11] Patent Number: 4,726,703

[45] Date of Patent: Feb. 23, 1988

[54] QUICK RELEASE COLLET HUB

[76] Inventor: Louis S. Ashley, 9211 Blue Bell Rd., Pleasant City, Ohio 43772

[21] Appl. No.: 864,516

[22] Filed: May 19, 1986

[51] Int. Cl.$^4$ .......................... B25G 3/20; F16B 2/00
[52] U.S. Cl. .................................. 403/370; 403/371; 403/368
[58] Field of Search .................. 403/371, 370, 368, 16

[56] References Cited

U.S. PATENT DOCUMENTS

| | | | |
|---|---|---|---|
| 3,215,383 | 11/1965 | Wright | 403/370 X |
| 3,596,943 | 8/1971 | Krauss | 403/370 |
| 4,152,948 | 5/1979 | LiDonnici | 403/370 X |
| 4,268,185 | 5/1981 | Mullenberg | 403/16 |

FOREIGN PATENT DOCUMENTS 155736  3/1939  Austria ................................. 403/370

Primary Examiner—Andrew V. Kundrat
Attorney, Agent, or Firm—Fleit, Jacobson, Cohn & Price

[57] ABSTRACT

A pair of relatively telescoped inner and outer sleeves are provided and the inner sleeve includes first and second end portions. The second end portion of the inner sleeve includes at least one generally radial slot formed therethrough and defines a step recess opening radially outwardly of the inner sleeve and longitudinally therealong outwardly of the first end of the inner sleeve. The outer sleeve defines a radially inwardly opening recess which also opens axially in a direction in which the second end of the inner sleeve faces and the step recesses are registered with each other and together define a circumferential cavity between relatively telescoped portions of the inner and outer sleeves. Axially extending and circumferentially spaced threaded fasteners are secured between the sleeves for forcing the sleeves in opposite axial directions relative to each other to reduce the axial extent of the cavity and the cavity includes force direction change structure disposed therein operative to convert a portion of the force generated by the fasteners into generally radial inward force on the inner sleeve second end at points spaced circumferentially thereabout to thereby radially inwardly force circumferentially spaced portions of the second end of the inner sleeve tightly against a shaft upon which the inner sleeve is disposed for high torque transfer between the inner sleeve and the shaft.

11 Claims, 16 Drawing Figures

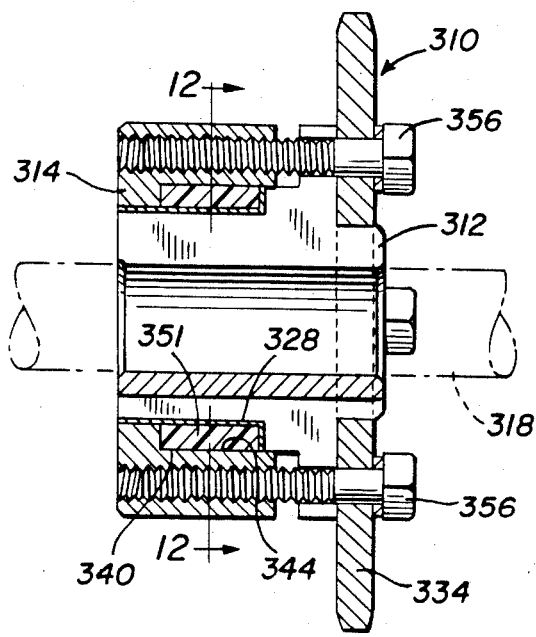
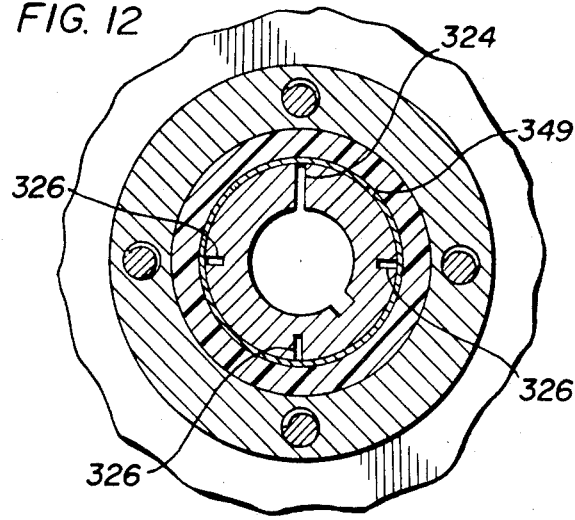
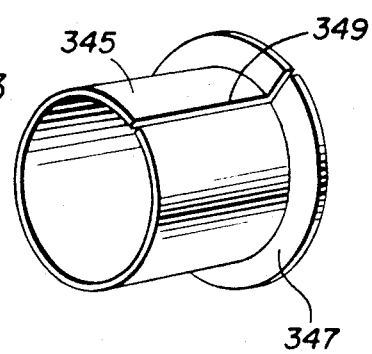
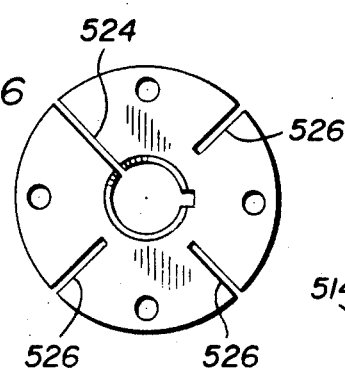
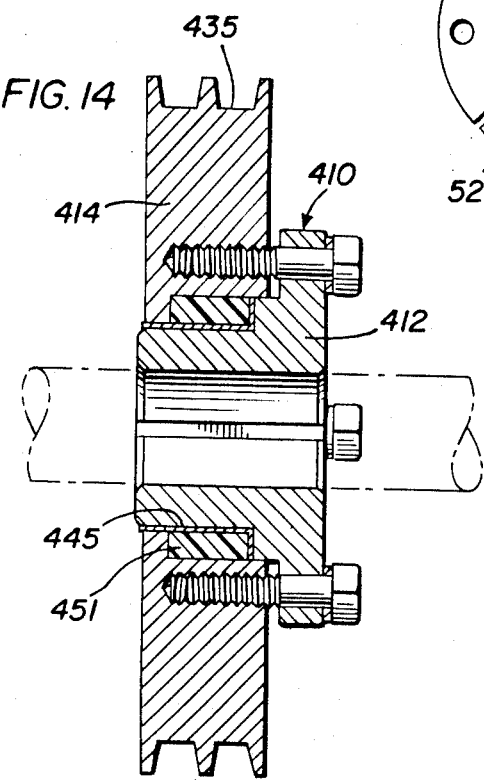
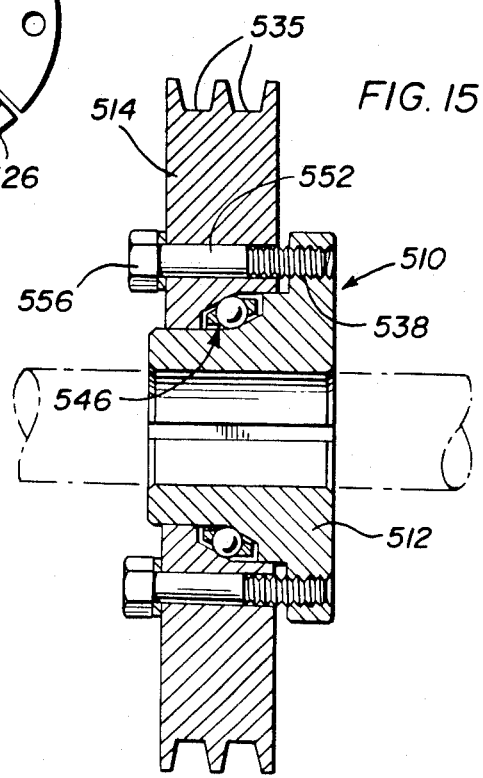

QUICK RELEASE COLLET HUB

BACKGROUND OF THE INVENTION

1. Field of the Invention

This invention relates to an improved hub construction of the collet-type and utilizes concentric telescopically engaged sleeve members with the inner sleeve member including a radial slot formed therethrough and the inner and outer sleeve members defining radially outwardly and radially inwardly opening step recesses, respectively, together defining a closed annular cavity between the sleeve members. Structure is provided for force shifting the sleeve members in opposite axial directions relative to each other and force direction change structure is contained within the cavity for developing a radial inward force on the inner sleeve member responsive to the sleeve members being forced in opposite radial directions relative to each other.

2. Description of Related Art

Various different forms of collet-type hubs and other structures including some general structural features similar to those included in the instant invention are disclosed in U.S. Pat. Nos. 2,003,144, 2,410,832, 3,367,727, 3,627,339 and 4,318,310. However, most presently used collettype hubs incorporate inner and outer sleeves provided with outer and inner mating conical surfaces and circumferentially spaced axially extending threaded fasteners are secured between the sleeves for relatively axially shifting the sleeves in a direction whereby the mating conical surfaces apply a radial inward thrust on the inner sleeve, the inner sleeve being provided with at leat one radial slot whereby it may be tightly clamped against an associated shaft extending therethrough. However, when it is desired to remove or reposition a hub of this type, the clamp fasteners used to axially shift the sleeves relative to each other in order to clamp the inner sleeve about an associated shaft must be completely removed and reinserted in special additionally threaded bores provided therefor whereby the inner and outer sleeves may be reversely axially shifted relative to each other in order to force the outer sleeve out of clamped engagement with the inner sleeve. Then, if the hub is to be reinstalled on the associated shaft, the fasteners must again be completely removed and reinstalled in their original positions in order that they again may be used to axially shift the sleeves relative to each other in order to clamp the inner sleeve above the associated shaft.

The removal of a plurality of threaded fasteners, the reinstallation of the threaded fasteners in different bores, the subsequent further removal of the threaded fasteners and the reinstallation of those threaded fasteners in the original bores is time consuming. Accordingly, a need exists for a collet-type hub which may be more readily released merely by the loosening the associated clamping screws.

SUMMARY OF THE INVENTION

The collet hub of the instant invention is of the quick release type and includes relatively telescoped inner and outer sleeves which are forcibly shifted axially relative to each other in order to cause the inner sleeve to tightly frictionally grip a shaft extending therethrough. However, the collet hub is constructed in a manner whereby loosening of the threaded fasteners provided for axially shifting the sleeves relative to each other will effect full release of the clamping action of the inner sleeve on the associated shaft in order to enable removal of the collet hub or repositioning of the collet hub on the associated shaft without total removal of the fasteners.

The main object of this invention is to provide a quick release collet hub for mounting on a shaft and capable of transferring considerable torque from the shaft to the collet hub or from the hub to the shaft as well as constructed in a manner whereby the collet hub may be quickly released from tight frictional engagement with the associated shaft for removal or repositioning thereon.

Another object of this invention is to provide a collet hub including relatively telescoped and rotatable inner and outer sleeve members having circumferentially spaced axially extending threaded fasteners connected therebetween for axially shifting the sleeve members relative to each other, structure being provided and operatively associated with both sleeve members for causing the inner sleeve member to tightly grip the associated shaft responsive to relative axial displacement of the sleeve members.

Yet another object of this invention, in accordance with the immediately preceding objects is to provide wedge structure operatively associated with the inner and outer sleeve members for causing the inner sleeve member to tightly grip an associated shaft responsive to relative axial displacement of the sleeve members and wherein the wedge members comprise caged balls.

A further object of this invention, in accordance with the immediately preceding objects is to utilize caged hardened wedge balls in conjunction with opposing similarly inclined conical surfaces formed on the inner and outer sleeve members and wherein the conical surfaces are not hardened and are dimpled responsive to an initial tightening of the associated threaded fasteners, the dimples formed in the conical surfaces of the inner and outer sleeve members, in conjunction with the cages balls, subsequently defining detent positions of relative rotation of the sleeve members to thereby assist in maintaining the sleeve members in predetermined relatively rotated positions until such time as the clamp fasteners may be threadedly engaged therewith.

Yet another important object of this invention is to provide a quick release collet hub incorporating a removable gear or sprocket wheel blank.

Another important object of this invention is to provide a quick release collet hub capable of utilizing an intermediate sleeve of elastometric material interposed between inner and outer sleeve members of the hub provided with aligned step recesses to define an annular cavity in which to receive the intermediate elastometric sleeve, the elastometric sleeve being radially expandable responsive to axial compression thereof in order to cause contraction of at least one end portion of the inner sleeve against an associated shaft.

A final object of this invention to be specifically enumerated herein is to provide a quick release collet hub in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparant reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a vertical sectional view similar to FIG. 3 and illustrating a fourth form of the invention utilizing an elastometric intermediate sleeve in lieu of wedge balls;

FIG. 12 is an enlarged vertical sectional view taken substantially upon the plane indicated by the section line 12—12 of FIG. 11;

FIG. 13 is a perspective view of the radial slotted thin walled sleeve incorporated in the fourth form of the invention;

FIG. 14 is a vertical sectional view similar to FIG. 11 illustrating a modification of the fourth form;

FIG. 15 is a vertical section view of a fifth form of the invention wherein the outer sleeve is equipped with a flanged outer periphery; and FIG. 16 is a right side elevational view of the inner sleeve portion of the fifth form illustrated in FIG. 15.

DESCRIPTION OF THE PREFERRED EMBODIMENTS

Figure 1:
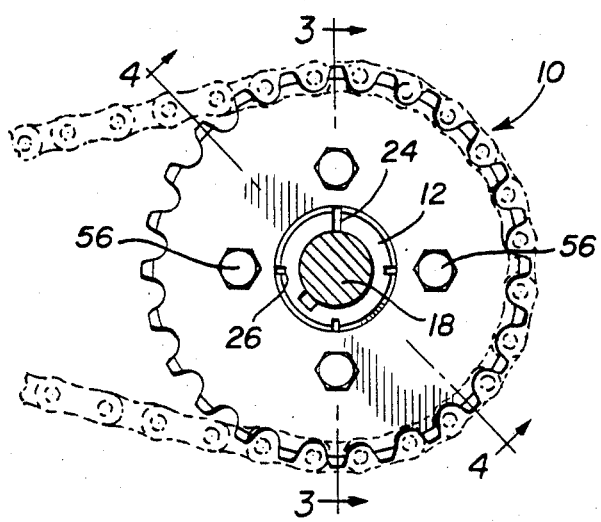
FIG. 1 is an elevational view of a first form of a quick release collet hub constructed in accordance with the present invention and incorporating a sprocket wheel blank.
Figure 2:
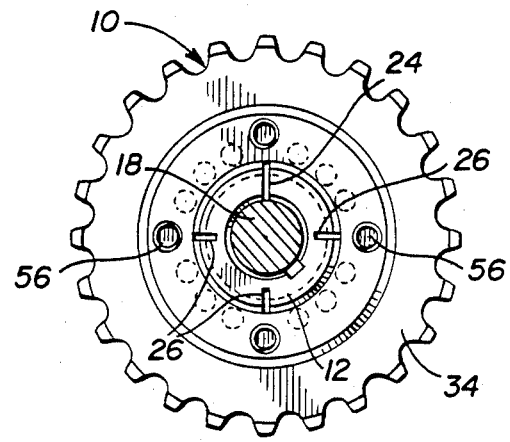
FIG. 2 is an elevational view of the assemblage illustrated in FIG. 1 as seen from the rear side thereof.

Referring now more specifically to the drawings, the numeral 10 generally designates a first form of quick release collet hug of the instant invention. The collet hub 10 includes a first inner sleeve member 12 and a second outer sleeve member 14 telescoped over the inner sleeve member 12. The inner sleeve member 12 defines a longitudinal central bore 16 formed therethrough in which a shaft 18 is snugly received and first and second ends 20 and 22. Further, the sleeve member 12 includes a full length radial slot 24 formed therein which opens through both the inner and outer peripheries or the inner sleeve member 12. In addition, the sleeve member 12 includes full length outer radial slots 26 formed therein which open only through the outer periphery of the sleeve member 12. In addition, the first end 20 of the inner sleeve member 12 defines an outer step recess 28 formed therein including a frusto-conical peripherally extending ramp or wedge surface 30. The recess 28 opens radially outwardly of the inner sleeve member 12 and endwise outwardly of the first end 20 of the sleeve member 12. Also, the second end 22 includes an outer relieved area 31 concentric with bore 16 in which the inner periphery 32 of a sprocket blank or annular torque transfer member 34 is seated and radially and axially located and with said relieved area 31 defining an annular radial shoulder 33 against which the inner peripheral portion of the blank is abutted. The outer periphery of the inner sleeve member 12 is provided with circumferentially spaced axially extending bores 36 radially aligned with the slots 24 and 26 and with which smooth bores 38 formed in the inner periphery of the sprocket blank 34 are registered.

Figure 6:
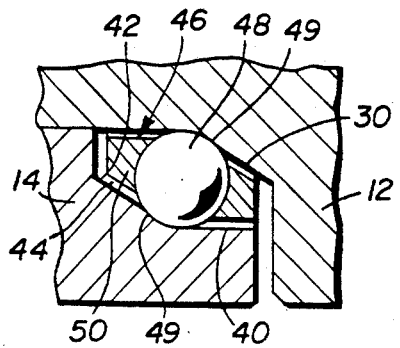
FIG. 6 is a fragmentary enlarged vertical sectional view illustrating the frusto-conical ramps of the inner and outer sleeves of the hub and the associated wedge balls.

The outer sleeve member 14 is telescoped over the first end 20 of the inner sleeve member 12 and includes an inwardly opening step recess 40 opposing the recess 28 and including a frusto-conical ramp surface 42 opposing the ramp surface 30, the recesses 28 and 40 together defining a closed cavity 44 in which a wedge assembly referred to in general by the reference numeral 46 is disposed, the assembly 46 including a plurality of circumferentially spaced balls mounted in an annular cage 50, see FIG. 6. In addition, the outer sleeve member 14 includes four peripherally spaced and axially extending threaded bores 52 registrable with the bores 36 and 38 and in which the threaded shank portions 54 of a plurality of headed fasteners 56 passed through the bores 36 and 38 are threadedly engaged.

Accordingly, the fasteners 56 maintain the sprocket blank 34, the sleeve members 12 and 14 and the wedge assembly 46 in relatively assembled relation.

With the fasteners 56 loosened, the hub 10 may be slid onto and positioned axially along the shaft 18 as desired. Then, the fasteners 56 are tightened. Relative axial displacement of the sleeve members 12 and 14 as a result of tightening the fasteners 56 causes the balls 48 to transform a portion of the axial thrust developed by the fasteners 56 into radial inward thrust on the second end 22 the inner sleeve member 12 whereby the latter will tightly grip the shaft 18.

An important aspect of this invention is that when it is desired to remove the hub 10 or reposition the hub 10 on the shaft 18, it is merely necessary to loosen the fasteners 56. Immediately upon loosening of the fasteners 56, the second end 22 of the inner sleeve member 12 will expand sufficiently to allow the hub 10 to be slid longitudinally of the shaft 18 and from an unobstructed end thereof. This is in contrast to collet-type hubs similar to the hub 10 but which include only wedge or ramp surfaces corresponding to the surfaces 30 and 42 disposed in sliding contact with each other. With these types of collet hubs, it is necessary to completely remove fasteners corresponding to the fasteners 56 and to then reinstall the fasteners 56 in additional threaded bores formed in the corresponding outer sleeve member in order to force the inner and outer sleeve members apart. Then, if it is again desired to mount the conventional collet hub on a shaft corresponding to the shaft 18, the repositioned fasteners corresponding to the fasteners 56 must again be unthreaded and reinstalled in their original positions.

Figure 7:
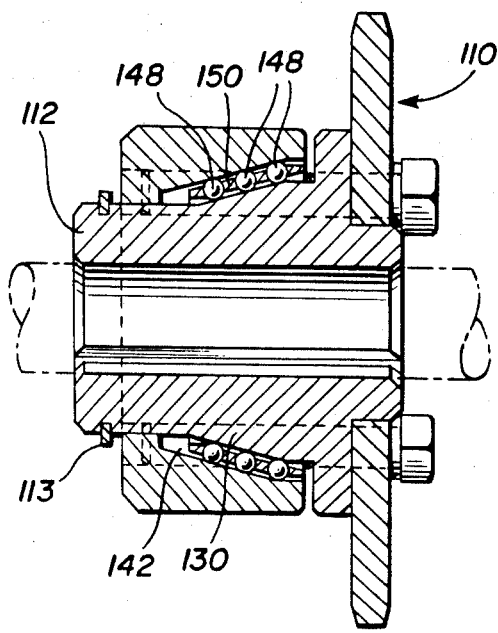
FIG. 7 is a vertical sectional view similar to FIG. 4 of a second form of the invention.
Figure 8:
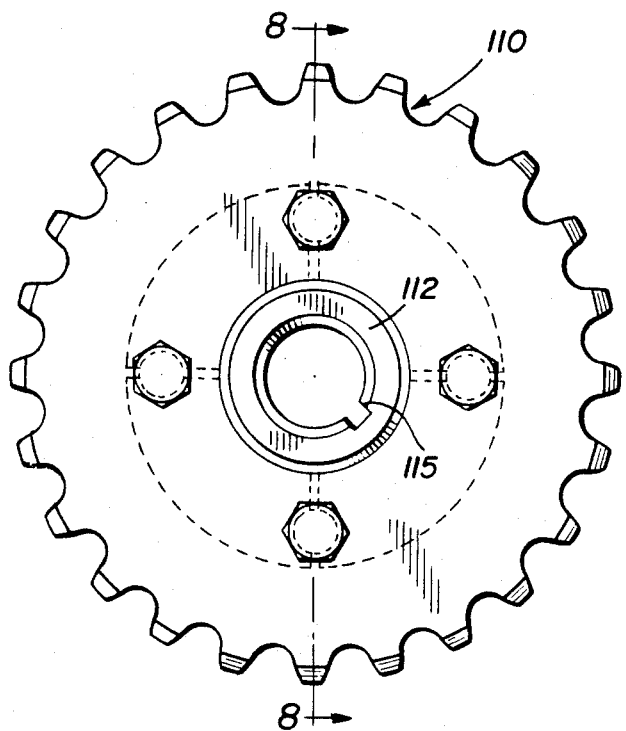
FIG. 8 is an elevational view of the second form as seen from the right side of FIG. 7.

With attention now invited more specifically to FIGS. 7 and 8 of the drawings, there may be seen a second form of collet hub referred to in general by the reference numeral 110 and which is similar in substantially all respects to the collet hub 10 except that the cage 150 thereof includes three circumferential rows of balls 148 corresponding to the balls 48. In addition, the inner sleeve member 112 of the collet hub 110 may include a retainer ring 113 thereon and also may include a keyway 115. Further, the incline of the ramp surfaces 130 and 142 may be different from the incline of the ramp surfaces 30 and 42.

Figure 9:
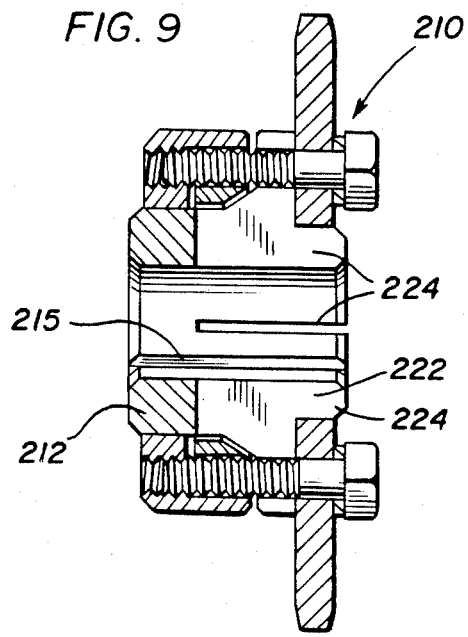
FIG. 9 is a vertical sectional view similar to FIG. 3 illustrating a third form of the invention.
Figure 10:
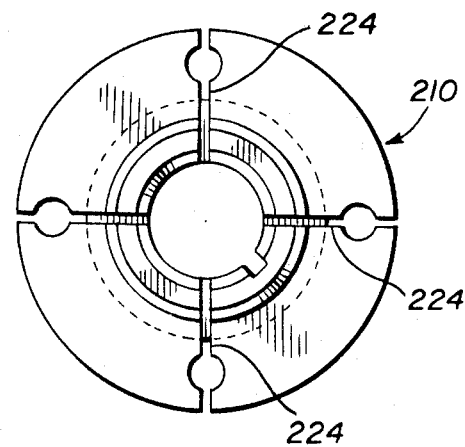
FIG. 10 is an elevational view of the inner sleeve of the third form as seen from the right side of FIG. 9.

With attention now invited more specifically to FIGS. 9 and 10, there may be seen a third form of collet hub referred to in general by the reference numeral 210 and which is similar in many respects to the collet hub 10. However, while the inner sleeve 212 of the collet hub 110 includes a keyway 215 corresponding to the keyway 115, the inner sleeve 212, includes four circumferentially spaced full radial extent slots 224 formed in the second end 22 of the inner sleeve member 212.

With reference now more specifically to FIGS. 11, 12 and 13, there may be seen a fourth form of collet hub referred to in general by the reference numeral 310 and incorporating inner and outer sleeve members 312 and 314. The inner and outer sleeve members 312 and 314 include step recesses 328 and 340 corresponding to the recesses 28 and 40, but which do not include ramp surfaces corresponding to the ramp surfaces 30 and 42. Rather, the cavity 344 defined by the recesses 328 and 340 is substantially rectangular in radial cross section. In addition, a radially split thin wall sleeve 345 is disposed within the recess 328 and includes an inner end radially outwardly projecting flange 347 whose radial extent is substantially the same as the radial extent of the cavity 344. The radial slot 349 in the sleeve 345 is angularly displaced from the slot 324 and the slots 326 corresponding to the slots 24 and 26 and an intermediate elastomeric sleeve 351 is snugly received in the cavity 344 and serves the purpose of wedge assembly 46. Upon axial compression of the intermediate sleeve 351 by tightening the fasteners 356 corresponding to the fasteners 56, the elastometric sleeve 351 is radially expanded thereby radially inwardly compressing the inner sleeve member 312 into tight engagement with the associated shaft 318.

With attention now invited more specifically to FIG. 14, a modification of the collet hub 310 is generally referred to by the reference numeral 410. The collet hub 410 is substantially identical to the collet hub 310 except that the collet 410 does not include a sprocket blank similar to the sprocket blank 334, but instead includes a grooved outer periphery 435 whereby drive belts may be trained thereabout. Of course, the outer sleeve member 314 could include sprocket teeth in lieu of providing the sprocket blank 334 as an additional component, but the extra tooling involved in providing sprocket teeth on the outer sleeve member 314 would be cost prohibitive. On the other hand, by merely making the equivalent of the outer sleeve member of greater radial extent and grooving the outer periphery thereof, a collet hub for use in conjunction with drive belts is inexpensively provided utilizing only the inner and outer sleeve members 412 and 414 corresponding to the sleeve members 312 and 314 and an elastometric intermediate sleeve 451 and thin walled sleeve 445 corresponding to the sleeves 351 and 345.

Finally, with attention invited more specifically to FIGS. 15 and 16, a fifth form of collet hub is referred to in general by the reference numeral 510. The collet hub 510 includes an outer sleeve member 514 provided with outer peripheral grooves 535 corresponding to the grooves 435 and utilizes a wedge assembly 546 corresponding to the wedge assembly 46. In addition, the fasteners 556 are passed through smooth bores 552 formed in the inner sleeve member 514 and threaded into threaded bores 538 formed in the inner sleeve member 512. Furthermore, the inner sleeve member 512 includes one full radial extent slot 524 and three partial radial extent slots 526.

Figure 3:
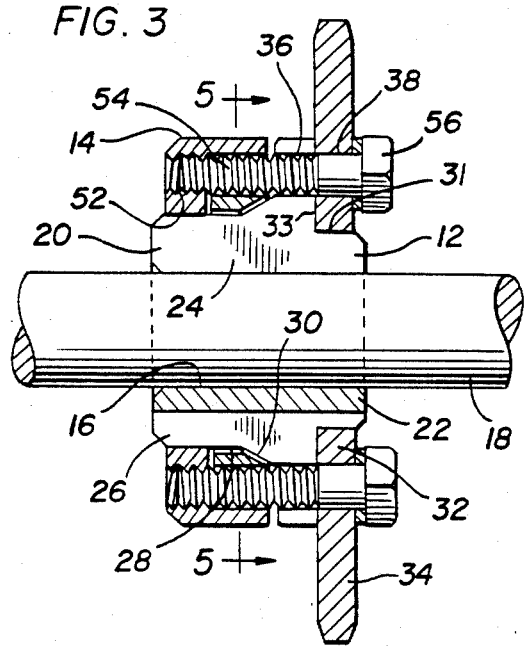
FIG. 3 is a vertical sectional view taken substantially upon the plane indicated by the section line 3—3 of FIG. 1.
Figure 4:
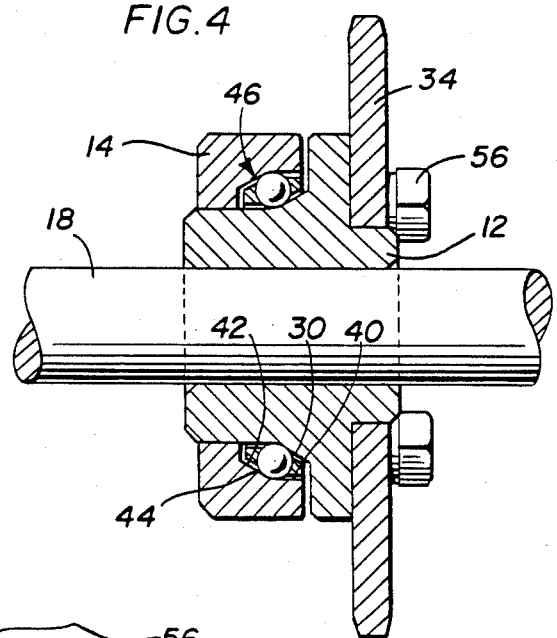
FIG. 4 is a sectional view taken substantially upon the plane indicated by the section line 4—4 of FIG. 1.
Figure 5:
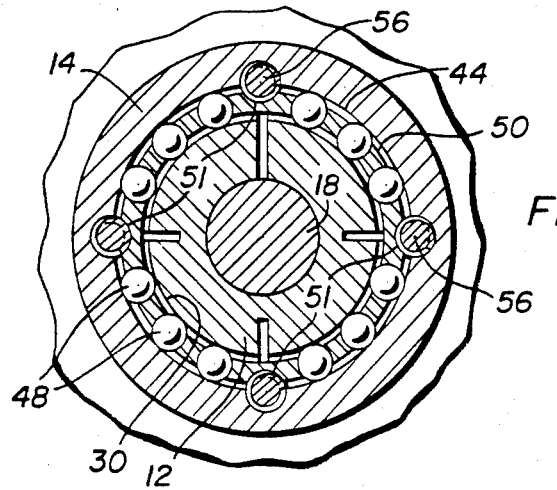
FIG. 5 is an enlarged vertical sectional view taken substantially upon the plane indicated by the sectional line 5—5 of FIG. 3.

With attention now invited more specifically to FIG. 6 of the drawings, it is pointed out that when the fasteners 56 shown in FIG. 3 are tightened for the first time, the hardened balls 48 form dimples in the ramp surfaces 30 and 42 as at 49 since the surfaces 30 and 42 are not hardened. These dimples subsequently serve as detents whereby proper angular displacement of the inner and outer sleeve members 12 and 14 and the wedge assembly 46 are readily determined by "feel" when the bores 36 and 52 are properly registered with each other and the notches 51 formed in the outer periphery of the cage 50, the bolts 56 being received through the notches 51, see FIG. 5. In this manner, the collet hub 10 may be properly assembled and applied to the shaft 18 even when it is impossible to visually ascertain when the bores 36 and 52 are registered with the notches 51. This detent positioning by "feel" also applying to the collet hubs 110 and 510.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a shaft, first and second inner and outer relatively telescoped sleeve members, said first sleeve member being snugly and slidingly disposed on said shaft and including first and second end portions, said first sleeve member including at least one generally radial slot formed therethrough whereby said first sleeve member may be contracted about and tightly grip said shaft, said first sleeve member second end including a first outwardly facing frustoconical surface, said second sleeve member including a second inwardly facing frusto-conical surface opposing said first frusto-conical surface, combined anti-friction and force direction change means interposed between said frusto-conical surfaces, force means connected between said sleeve members for forcibly shifting said sleeve members in the axial directions relative to each other to advance said frusto-conical surfaces toward engagement with each other, said combined anti-friction and force direction change means being operative to convert a portion of the force generated by said force means to sift said sleeve members in said axial directions into a generally radial inward force on said inner sleeve member for tight torque transfer grip of said inner sleeve member on said shaft, said first sleeve member second end including an outer annular relieved area coaxial with said first sleeve member and defining an annular radial shoulder, an annular torque transfer member having a center opening formed therein mounted on said relieved area and including an inner peripheral portion abutted against said shoulder, said force means including a plurality of elongated circumferentially spaced shank-type threaded fastener means generally paralleling said shaft and spaced thereabout, said shank-type threaded fastener means passing through circumferentially spaced smooth bores formed through said first sleeve member and being operably connected between corresponding circumferentially spaced inner peripheral portions of said torque transfer member and said second sleeve member for drawing said torque transfer member and said second sleeve member toward each other with said inner periphery of said torque transfer member tightly seated against said shoulder.

2. The shaft and inner and outer sleeve member combination of claim 1 wherein said combined anti-friction and force direction change means includes a plurality of wedge members disposed between said pairs of wedge surfaces.

3. The combination of claim 2 wherein said wedge members comprise ball members.

4. The combination of claim 3 wherein said outer sleeve member includes a flanged outer periphery.

5. The combination of claim 3 wherein said inner sleeve member includes outer peripheral sprocket teeth.

6. The combination of claim 3 wherein said ball members are arranged in a single circumferentially extending row of ball members.

7. The combination of claim 3 wherein said ball members are arranged in a plurality of circumferentially extending rows of ball members spaced axially along said cavity means.

8. The combination of claim 3 wherein said inner sleeve member second end portion includes only a single radial slot formed therethrough, said ball members being arranged in a single circumferentially extending row of ball members, said inner sleeve member including outer peripheral sprocket teeth.

9. The combination of claim 3 wherein said ball members are caged.

10. In combination with a shaft, first and second inner and outer relatively telescoped sleeve members, said first sleeve member being snugly and slidingly disposed on said shaft and including first and second end portions, said first sleeve member including at least one generally radial slot formed therethrough whereby said first sleeve member may be contracted about and tightly grip said shaft, said first sleeve member defining first step recess means opening radially outwardly thereof and axially along said first sleeve member toward first end thereof, said second sleeve member defining second step recess means opening radially inwardly thereof and axially along said second sleeve member toward said second end of said first sleeve member, said step recess means of said first and second sleeve members being radially registered and together defining radially and axially extending closed cavity means, force means connected between said sleeve members for forcibly shifting said sleeve members, each relative to the other, in the axial direction in which the corresponding step recess means opens axially therealong and force directio change means disposed in said cavity means operative to convert a portion of the force generated by said force means to shift said sleeve members relative to each other to a generally radial inward force on said inner sleeve member second end at points spaced circumferentially thereabout for tight torque transfer grip of said inner sleeve member second end on said shaft, said step recess means including a pair of similarly inclined radially aligned wedge surface portions spaced thereabout, said force direction change means including a plurality of wedge members disposed between said pairs of wedge surfaces, the wedge surface portions of said inner and outer sleeve members comprising circumferentially spaced portions of outwardly and inwardly facing partial conical surfaces and said wedge members comprising ball members, said ball members being harder than said partial cylindrical surfaces and forming indentations therein responsive to initial operation of said force means to thereby establish detents for proper reassembly of said sleeve members and balls prior to the assembly comprising said sleeve members and balls being mounted on said shaft.

11. In combination with a shaft, first and second inner and outer relatively telescoped sleeve members, said first sleeve member being snugly and slidably disposed on said shaft and including first and second end portions, said second end portion including at least one generally radial slot formed therethrough whereby said second end portion may be contracted about and tightly grip said shaft, said first sleeve member second end portion including a first outwardly facing frusto-conical surface, said second sleeve member including a second inwardly facing frusto-conical surface opposing said first frusto-conical surface, a plurality of wedge balls disposed between said frusto-conical surfaces, and means operatively connected between said sleeve members for forcibly relatively axially shifting said sleeve members to diminish the spacing between said frusto-conical surfaces, said balls being caged in an annular cage, said balls being hardened and of a hardness greater than the portions of said inner and outer sleeves defining said first and second frusto-conical surfaces.

* * * * *